United States Patent
Highby et al.

(10) Patent No.: US 7,137,221 B2
(45) Date of Patent: Nov. 21, 2006

(54) SPINNING DECOY DEVICE

(75) Inventors: Dennis Highby, Sidney, NE (US);
Ronald D. Nelson, Sidney, NE (US);
Gregg V. Severinson, Sidney, NE (US)

(73) Assignee: Cabela's Inc., Sidney, NE (US)

( * ) Notice: Subject to any disclaimer, the term of this patent is extended or adjusted under 35 U.S.C. 154(b) by 0 days.

(21) Appl. No.: 10/755,050

(22) Filed: Jan. 8, 2004

(65) Prior Publication Data
US 2005/0150149 A1    Jul. 14, 2005

(51) Int. Cl.
*A01M 31/06* (2006.01)
(52) U.S. Cl. ............................................. 43/2; 446/227
(58) Field of Classification Search ...................... 43/2, 43/3; 446/227
See application file for complete search history.

(56) References Cited

U.S. PATENT DOCUMENTS

| | | | |
|---|---|---|---|
| 1,376,282 A | 4/1921 | Kauffman | |
| 2,413,418 A * | 12/1946 | Rulison | 43/3 |
| 2,547,286 A * | 4/1951 | Sabin | 43/3 |
| 2,726,469 A | 12/1955 | Becker | |
| 2,769,276 A * | 11/1956 | Steiner | 446/227 |
| 3,290,817 A * | 12/1966 | Kravath | 446/227 |
| 3,762,702 A * | 10/1973 | Keele et al. | 472/10 |
| 4,422,257 A * | 12/1983 | McCrory | 43/3 |
| 4,660,313 A | 4/1987 | Bauernfeind et al. | |
| 5,074,071 A * | 12/1991 | Dunne | 43/3 |
| 5,832,649 A | 11/1998 | Kilgore | |
| 5,956,880 A * | 9/1999 | Sugimoto | 43/2 |
| 6,079,140 A | 6/2000 | Brock, IV | |
| 6,430,863 B1 | 8/2002 | Krag | |
| 6,508,028 B1 * | 1/2003 | Crowe | 43/3 |
| 6,907,688 B1 * | 6/2005 | Brint | 43/2 |
| 2002/0094748 A1 * | 7/2002 | Baik | 446/227 |
| 2004/0237373 A1 * | 12/2004 | Coleman | 43/3 |

* cited by examiner

*Primary Examiner*—Teri Pham Luu
*Assistant Examiner*—Susan C. Alimenti
(74) *Attorney, Agent, or Firm*—Bachman & LaPointe

(57) ABSTRACT

A spinning decoy device for use by hunters to attract birds, such as ducks and geese, has at least one decoy deployed in an elevated position, and a motorized system for spinning the decoy(s) so as to attract the birds. The motorized system, in a preferred embodiment, spins the decoy(s) in a circular motion. To further add realism to the device, the wings of each decoy are rotatable.

5 Claims, 2 Drawing Sheets

_US 7,137,221 B2_

SPINNING DECOY DEVICE

BACKGROUND OF THE INVENTION (a) Field of the Invention

The present invention relates to a spinning decoy device to be used by hunters and more particularly to a spinning decoy device that has one or more decoys which are spun in a circular motion to attract birds flying overhead.

(b) Prior Art

A wide variety of devices have been used by hunters to attract birds such as waterfowl. These devices have included a number of different devices for deploying decoys on a body of water and imparting motion to the decoys. U.S. Pat. Nos. 4,660,313 to Bauernfeind et al.; 2,547,286 to Sabin; 1,376,282 to Kauffman; 6,079,140 to Brock IV; 2,726,469 to Becker; and 4,422,257 to McCrory exemplify such devices.

U.S. Pat. No. 6,430,863 to Krug illustrates a duck decoy system for simulating a landing duck.

U.S. Pat. No. 5,832,649 illustrates a decoy mobile.

Also known in the prior art is a motorized bird repellent apparatus which causes a flying body imitating a raptor to scare away birds. Such an apparatus is illustrated in U.S. Pat. No. 5,956,880 to Sugimoto.

Despite the existence of these decoys, there still remains a need for motion decoys which better attract birds flying overhead.

SUMMARY OF THE INVENTION

Accordingly, it is an object of the present invention to provide a device to be used by hunters for attracting birds flying overhead.

The foregoing object is attained by the spinning decoy device of the present invention.

In accordance with the present invention, a decoy device is provided. The decoy device broadly comprises at least one decoy deployed in an elevated position, and motorized means for spinning the decoy(s) so as to attract birds flying overhead. In a preferred embodiment of the present invention, each decoy has rotatable wings to further add to the realism of the device.

Other details of the spinning decoy device of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
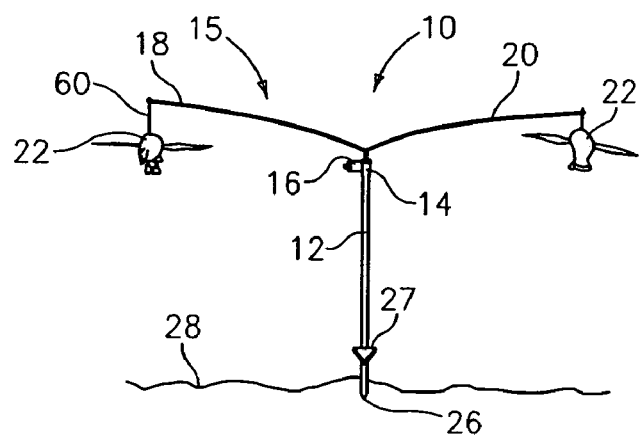
FIG. 1 illustrates the spinning decoy device of the present invention.

Referring now to the drawings, FIG. 1 illustrates a spinning decoy device 10 in accordance with the present invention. The device 10 includes a post or stake 12, a motor mounting bracket 14 connected to the post 12, a motor 16 attached to the bracket 14, an arm arrangement 15 preferably having at least two arms 18 and 20, which arm arrangement is connected to the motor 16, and at least two decoys 22 connected to the respective arms 18 and 20. The post or stake 12 preferably has a pointed end 26 for enabling the post 12 to be inserted into the ground 28. It may also be provided with a triangular shaped portion 27 which adds stability to the positioning of the post 12. The post or stake 12 may be formed from any suitable material known in the art, preferably steel and may have a plurality of attachable/detachable sections to provide height adjustment.

While the drawings illustrate two decoys 22, the device 10 will operate just as well with one decoy 22 attached to one arm driven by the motor 16.

While the present invention will be discussed in the context of being placed over solid ground, it should be noted that the post or stake 12 could be positioned in a body of water such as a shallow pond or a marsh.

Figure 2:
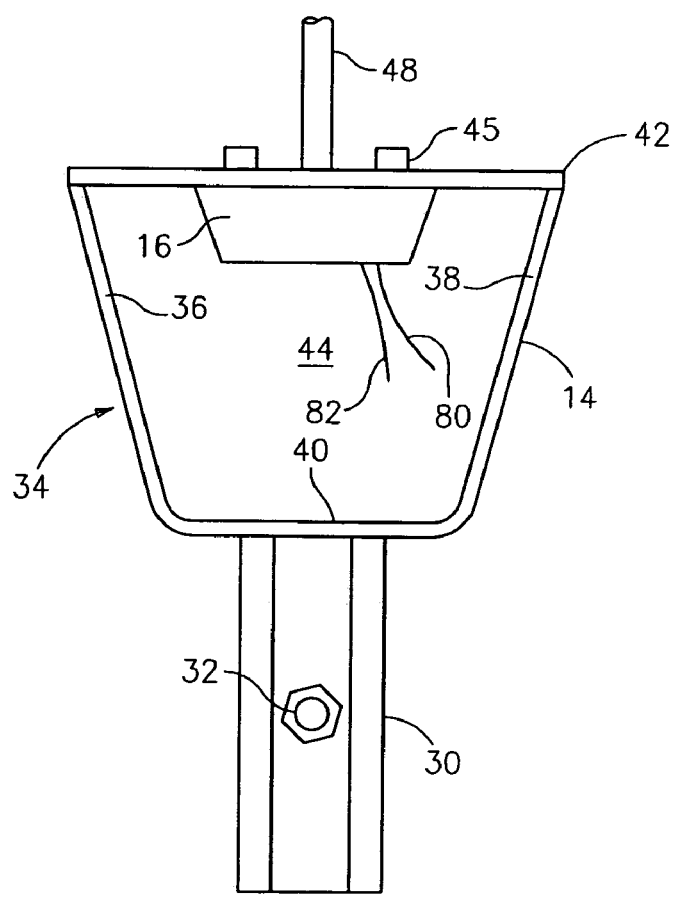
FIG. 2 illustrates a motor mounting bracket used in the device of FIG. 1.
Figure 3:
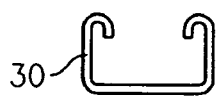
FIG. 3 is a sectional view of a support member which forms part of the bracket of FIG. 2 taken along lines 3—3.

Referring now to FIG. 2, the motor mounting bracket 14 is illustrated. The bracket 14 has a support member 30 which is substantially C-shaped as shown in FIG. 3. The support bracket is shaped to correspond to the shape of the post 12 and to surround a portion of the post 12. The support member 30 may be attached to the post 12 using any suitable means known in the art. In a preferred embodiment, a threaded collar 32 is welded to the support member 30. The threaded collar receives a threaded wing nut that puts pressure on top of the post 12 that pushes up against the bracket 30 to hold the motor mounting bracket and the elements attached to it in place.

The motor mounting bracket 14 further includes a shaped bracket member 34 having diverging legs 36 and 38 and base portion 40 attached to the top of the support member 30, such as by welding. Still further, the bracket 14 has a top plate 42 which is welded to and extends between the legs 36 and 38. The top plate 42, the legs 36 and 38, and the base portion 40 define a space 44 into which the motor 16 is mounted.

Figure 4:
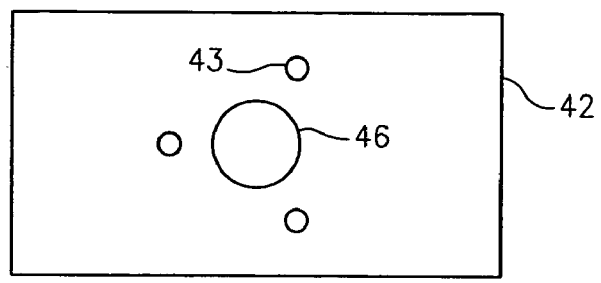
FIG. 4 is a top view of a top plate of the bracket shown in FIG. 2.

Referring now to FIG. 4, the top plate 42 has an aperture 46 for receiving an output shaft 48 of the motor 16. The top plate 42 also has a plurality of apertures 43 through which bolts 45 can pass to secure the motor 16 in place.

The motor 16 may comprise any suitable electrical motor known in the art. The motor 16 may have wires 80 and 82 for connecting the motor to a power source (not shown) such as a battery or other power pack. If desired, one of the wires may have an on-off switch (not shown) connected to it.

Figure 5:
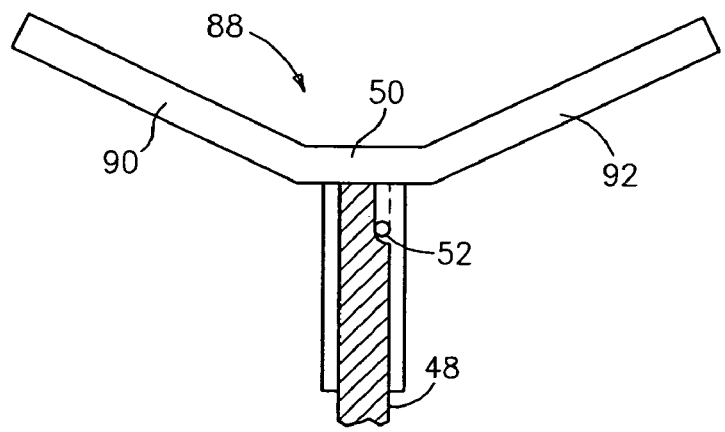
FIG. 5 illustrates a yoke assembly used in the device of FIG. 1.

As shown in FIG. 5, the arm arrangement 15 preferably includes a yoke 88 which includes one or more arms 90 and 92 extending outwardly from a base portion 50. The base portion 50 is attached to the motor output shaft 48 by a roll pin 52. Each of the arms 90 and 92 may be formed from any suitable material known in the art, preferably a steel material, and may have a solid or hollow construction. Each of the arms 90 and 92 may have a fixed length or may be adjustable in length. If the arms 90 and 92 are adjustable in length, each arm may be formed from a plurality of components joined together in any suitable manner known in the art. The arms 18 and/or 20 may be attached to the arms 90 and/or 92 by bolts, screws, or the like.

A decoy 22 is connected to the end of each arm 18 and 20 preferably by a tether 60. The tether 60 may be formed from any suitable material known in the art which has the strength to support the weight of the decoy 22 and the forces which are generated when the arms 18 and 20 are rotated. Alternatively, each decoy 22 may be solidly attached to a respective arm.

Figure 6:
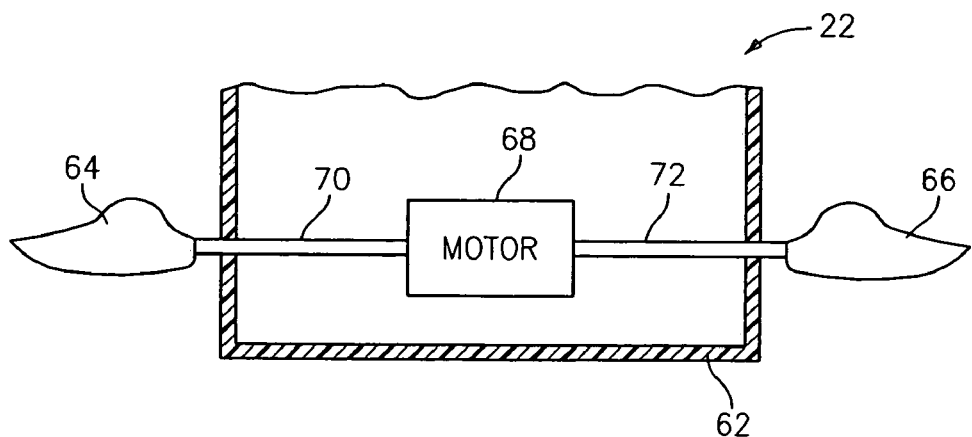
FIG. 6 is a sectional view of a decoy used in the device of FIG. 1.

Each decoy 22 may have a body 62 formed from any suitable material known in the art, such as a high strength plastic material. Additionally, each decoy 22 has a pair of rotatable wings 64 and 66. As shown in FIG. 6, each of the wings 64 and 66 are joined to an electric motor 68 by first and second shaft portions 70 and 72. The motor 68 may be any suitable battery powered motor known in the art. Each decoy 22 may have a holder (not shown) for holding one or more batteries and an electrical circuit for connecting the batteries to the motor 68. The circuit may include an on-off switch for starting and stopping the motor 68. The on-off switch may be manually or remotely operated.

While the decoy 22 has been described as having a motor 68, the motor may be omitted and the wings 64 and 66 may be rotated by the movement of the air over the wings as the device 10 is operated. In such an arrangement, the shaft portions 70 and 72 may form a single unitary shaft structure.

Alternatively, instead of having a single motor 68, each of the wings 64 and 68 may be driven by its own motor.

In operation, the post or stake 12 positions the decoy(s) 22 at a desired height above the ground 28 or above the surface of a body of water. The motor 16 causes the shaft 48 to rotate which in turn causes the arm(s) 18 and/or 20 to rotate about a vertical axis defined by the post 12. This causes the decoy(s) 22 to spin in a circular motion about the post 12. As the decoy(s) 22 spin, the wings 64 and 68 rotate. The motion created by the device of the present invention can be seen from a long distance by birds that are flying in the area. Coupled with the rotation of the wings, a realistic motion is created which can be used to attract birds, such as ducks and geese, flying overhead.

If desired, portions of the wings 64 and 68 may be painted with dark and light colors which create a well known flash effect as the wings 64 and 68 rotate. This flash effect may be used to attract birds flying overhead and bring them down where hunters can shoot them.

The decoy device of the present invention is advantageous because it creates a realistic motion which is likely to attract birds flying overhead. Further, it is easy to assemble and use. Still further, it can easily be disassembled and easily stored.

While the decoy device of the present invention has been described as having two arms and two decoys, it should be apparent that the device could have more than two arms attached to the shaft portion 48 and more than two decoys.

The decoy(s) 22 may have any desired configuration. For example, they may be manufactured to look like a duck or a goose.

It is apparent that there has been provided in accordance with the present invention a spinning decoy device which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A spinning decoy device comprising:
   at least one bird decoy deployed in an elevated position;
   motorized means for spinning said at least one bird decoy so as to attract birds flying above;
   said motorized means including a motor and at least one arm attached to said motor and rotated by said motor;
   post means for positioning said motor at a desired height; and
   said post means comprising a post to be placed on the ground and a bracket member connected to said post and said motor being attached to said bracket member,
   wherein said bracket member includes a base portion attached to said post, two diverging legs and a top plate attached to said legs and a portion of said motor being positioned in a space defined by said base portion, said two diverging legs and a top plate.

2. A device according to claim 1, wherein said top plate has an aperture and said legs have a shaft which extends through said aperture and connects to said motor.

3. A device according to claim 1, wherein each said decoy has wings which rotate.

4. A device according to claim 3, wherein said wings are rotated by contact with the air as each said decoy is spun by said motorized means.

5. A device according to claim 3, wherein said wings are rotated by at least one electric motor.

* * * * *